(12) United States Patent
Love et al.

(10) Patent No.: US 9,175,425 B2
(45) Date of Patent: Nov. 3, 2015

(54) UNBALANCED HYBRID CORDS AND METHODS FOR MAKING ON CABLE CORDING MACHINES

(71) Applicant: E I DU PONT DE NEMOURS AND COMPANY, Wilmington, DE (US)

(72) Inventors: Nathan W. Love, Richmond, VA (US); Brian R. France, N. Chesterfield, VA (US); Mark Allan Lamontia, Landenberg, PA (US); Clifford K Deakyne, Wilmington, DE (US)

(73) Assignee: E I DU PONT NEMOURS AND COMPANY, Wilmington, DE (US)

( * ) Notice: Subject to any disclaimer, the term of this patent is extended or adjusted under 35 U.S.C. 154(b) by 281 days.

(21) Appl. No.: 13/778,595

(22) Filed: Feb. 27, 2013

(65) Prior Publication Data

US 2014/0238524 A1    Aug. 28, 2014

(51) Int. Cl.
*D02G 3/28* (2006.01)
*D01H 7/00* (2006.01)
*F16L 11/02* (2006.01)
*H01B 13/00* (2006.01)
*F16L 11/08* (2006.01)

(52) U.S. Cl.
CPC .. *D02G 3/28* (2013.01); *D01H 7/00* (2013.01); *F16L 11/02* (2013.01); *F16L 11/081* (2013.01); *H01B 13/0003* (2013.01)

(58) Field of Classification Search
CPC ........ D07B 3/00; D07B 7/00; H01B 13/0003; B65H 1/02; B65H 1/08; B65H 1/12; B65H 2701/35
USPC ...................................... 57/90, 236, 238, 314
See application file for complete search history.

(56) References Cited

U.S. PATENT DOCUMENTS 4,590,754 A * 5/1986 Bouffard et al. ............. 57/58.55
7,513,021 B1    4/2009 Haselwander

FOREIGN PATENT DOCUMENTS

| KR | 20120030004 | 3/2012 |
| WO | WO01/18291 | 3/2001 |
| WO | WO2009/027615 | 3/2009 |

OTHER PUBLICATIONS

PCT International Search Report and Written opinion for International Application No. PCT/US2014/017244 Dated Jul. 24, 2014.
Barron E R, Hybrid Tire Cords Containing Keviar Aramid, Jan. 1, 1987, vol. 40, No. 2, p. 131-132.

* cited by examiner

*Primary Examiner* — Shaun R Hurley

(57) ABSTRACT

A hybrid cord formed from a plurality of component plies wherein at least two of the plies are of unequal ply length regardless of the twist of the plies and at least one of the plies has a length that is from 1 to 50 percent longer than the other plies and a method of providing a cord with predetermined twist and component ply lengths.

4 Claims, 2 Drawing Sheets

UNBALANCED HYBRID CORDS AND METHODS FOR MAKING ON CABLE CORDING MACHINES

BACKGROUND OF INVENTION

1. Field of the Invention

This invention relates to producing twisted hybrid cords.

2. Description of Related Art

Different types of materials, for example one having a higher modulus and one having a lower modulus, are often used together in hybrid cords for applications such as tire reinforcement. When forming a plied cord, it is common to use different twist levels in the high-modulus ply and the low-modulus ply to account for the difference in modulus between the two materials, or in order to achieve a desired cord response. This currently cannot be achieved on cable corders because they do not form cords in the same manner as ring twisters. Although hybrid cords can be made on cable corders, the cord behavior that can be achieved is limited to that of a balanced twist cord, that is, a cord where the high-modulus and low-modulus ply lengths are the same in which case there is only one response for any given twist level. When an unbalanced hybrid is required, it is currently made on ring twisters. Cable corders provide a tremendous productivity advantage, so it would be desirable to make both balanced and unbalanced hybrids on such machines considering that the unbalanced hybrids are more common than perfectly balanced twist hybrids.

SUMMARY OF THE INVENTION

The invention pertains to a hybrid cord comprising a plurality of plies, wherein at least two of the plies are of unequal ply length regardless of the twist of the plies and at least one of the plies has a length that is from 1 to 50 percent longer than the other plies.

DETAILED DESCRIPTION OF THE INVENTION

By hybrid cord we mean a cord consisting of at least two plies in which at least one ply has a different modulus from the other plies. As an example, one ply can be para-aramid and the other ply can be nylon. The plies may also be of the same composition, but of different modulus.

By zero ply twist we mean the amount of twist that could be measured in a ply if it were removed from a cord without untwisting the cord. By ply length we mean the length of the ply if it were removed from the cord without untwisting the cord.

Figure 1:
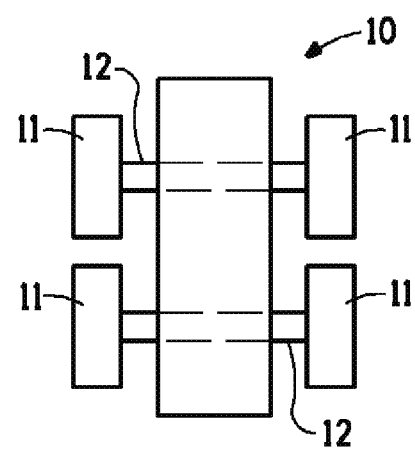
FIG. 1 depicts a prior art cable corder.
Figure 2:
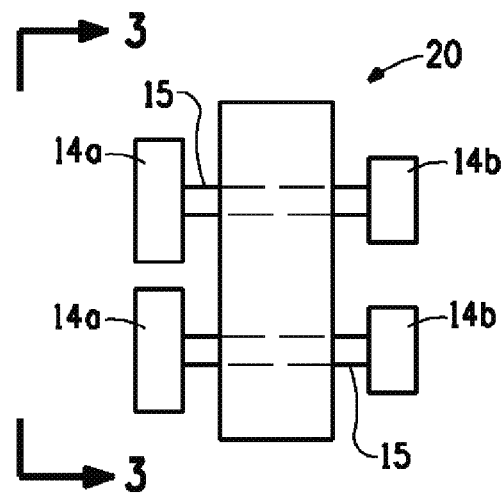
FIG. 2 depicts a front view of the inventive cable corder.
Figure 3:
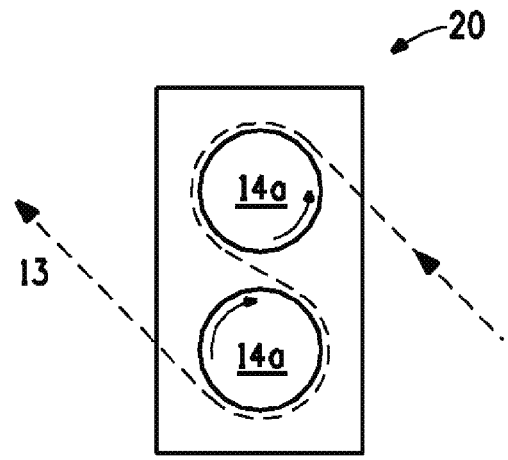
FIG. 3 depicts a side view of the inventive cable corder.

When two yarn plies are to be combined in the cable cording process, the plies run through a regulator. The regulator may consist of two pulleys on a first side connected by solid axles to two pulleys on a second side. The regulator helps assure the plies are entering the cord twist machine at the same rate. FIG. 1 shows generally at 10 a prior art regulator comprising pulleys 11 connected by axles 12. The diameters of the pulleys are all the same. FIG. 2 shows generally at 20 a regulator comprising pulleys 14a connected by axles 15 to pulleys 14b. The two pulleys 14a on the first side are of a larger diameter than the pulleys 14b on the second side, thus the ply traveling through the first side will enter the cord faster than the ply from the second side. This is because the pulleys on both sides are connected by a solid axle and must rotate at the same speed. The larger circumferences of the pulleys on the first side (as opposed to the pulleys on the second side 2) create a longer path for the ply to wrap around and therefore convey more ply for each rotation of the pulleys. FIG. 3 is a side view of FIG. 2 and shows the path of a ply 13 around the larger diameter pulleys 14a. A second component ply follows a similar path around the smaller diameter pulleys 14b (not shown). Thus at least two of the plies are of unequal ply length regardless of the twist of the plies. In one embodiment, this invention is to use a series of pulley sizes to create unbalanced hybrid cords. By sending a high modulus ply over larger pulleys and a lower modulus ply over the smaller pulleys, the high modulus ply will be longer than the other ply in the cord structure. The ratio between pulley sizes will dictate the ratio between ply lengths. If the pulleys for the high modulus ply are 25% larger in diameter than the pulleys for the low modulus ply, the former will be roughly 25% longer than the latter.

In addition to matching the behavior of unbalanced, ring-twisted hybrid cords at cable corder productivity levels, the quality of the cord can also be improved. When large differences in twist between high modulus plies and low modulus plies are made on ring twisters, the highly twisted low modulus ply provides a tremendous amount of residual torque in the cord. If the difference in length is achieved on a cable corder using different size pulleys, such residual torque in the low modulus ply will be minimized or absent. This will allow for more neutral cords and cords that should be easier to control in manufacturing.

The hybrid cord can be made of a plurality of plies, wherein there is zero twist in the plies and at least one of the plies has a length that is from 1 to 50 percent longer than the other plies or 1 to 35% longer or even 1 to 25% longer. The amount of differential length between the plies is selected to suit specific performance requirements. In some embodiments, the hybrid cord has a linear density of from 500 to 5000 denier. In some other embodiments, the hybrid cord has a linear density of from 1000 to 3500 denier. The hybrid cord may be made from polymeric plies such as meta-aramid, para-aramid, nylon, polyester, polyethylenenaphthalate (PEN), rayon, polypropylene, ultra-high-molecular weight polyethylene (UHMW-PE) or carbon. The hybrid cord may also be made from metallic plies.

The hybrid cord may comprise a single ply of a high modulus material and a single ply of a low modulus material, such as at least one p-aramid ply and at least one nylon ply, wherein the shortest length ply is nylon. The hybrid cord may even comprise at least one p-aramid ply and at least one m-aramid ply wherein the shorter length ply is m-aramid.

In one embodiment of this invention, the p-aramid ply is from 2 to 7 percent longer than the m-aramid ply, preferably from 3 to 6 percent longer or more preferably from 4 to 5 percent longer. A hybrid cord of this construction formed into a woven or knit fabric is particularly suitable for use in components that are subject to burst pressure testing at low temperatures such as room temperature and fatigue testing at high temperatures such as 175 degrees C. An example of such a component is a turbocharger hose where the cords provide structural reinforcement to an elastomeric material. Similar applications may be found in other mechanical rubber goods applications such as conveyor belts and tires.

The plies may have the same or different twist. In some embodiments, the plies have zero twist.

The pulleys may be adapted to fit any cabling machine such as those available from Oerlikon Saurer, Charlotte, N.C. or Verdol, Valence, France or Aalidhra Textile Engineers Ltd., Surat, India.

In one embodiment, the invention is also directed to a method of providing a cord with predetermined twist and component ply lengths having the steps of
(i) identifying the desired cord twist multiplier and component ply lengths,
(ii) identifying the number of component plies and the composition of each ply,
(iii) providing a cabling machine,
(iv) selecting appropriate size pulleys for the regulator of the cabling machine such that the pulleys on the first side are larger than the pulleys on the second side so as to provide the desired component ply length in the cord,
(v) setting the desired twist level for the hybrid cord into the cabling machine,
(vi) feeding the plies into the cabling machine, and
(vii) producing a cabled cord having the desired twist multiplier and component ply lengths.

In the method the component plies can have various combinations of twist. For example, the plies can all have zero twist; the component plies all have the same twist; or least two of the component plies can have a different twist.

EXAMPLES

The following examples are given to illustrate the invention and should not be interpreted as limiting it in any way.
Sample Preparation The para-aramid yarns used were Kevlar® K29 1100 dtex available from E.I. DuPont de Nemours and Company, Wilmington, Del.

The nylon yarns used were PA66 1400 dtex available from Invista, Wilmington, Del.

Cords were formed on an Oerlikon Allma CC3 cable cording machine with each cord comprising one p-aramid yarn and one nylon yarn. All of the cords had a twist multiplier of 6.5. One cord had both component yarns of equal length from passing both yarns over pulleys of equal diameter. Other cords had p-aramid yarns of a length 5%, 10% and 20% longer than the nylon yarns from using pulleys in which the diameter of the pulleys over which the p-aramid yarns passed were respectively of 5%, 10% and 20% greater diameter than those over which the nylon yarns passed. The cords were then tested for mechanical performance on an Instron® universal test machine model 5500. The test method was ASTM D885-07. Load vs. elongation at break profiles for the examples are shown in FIG. 4.

Figure 4:
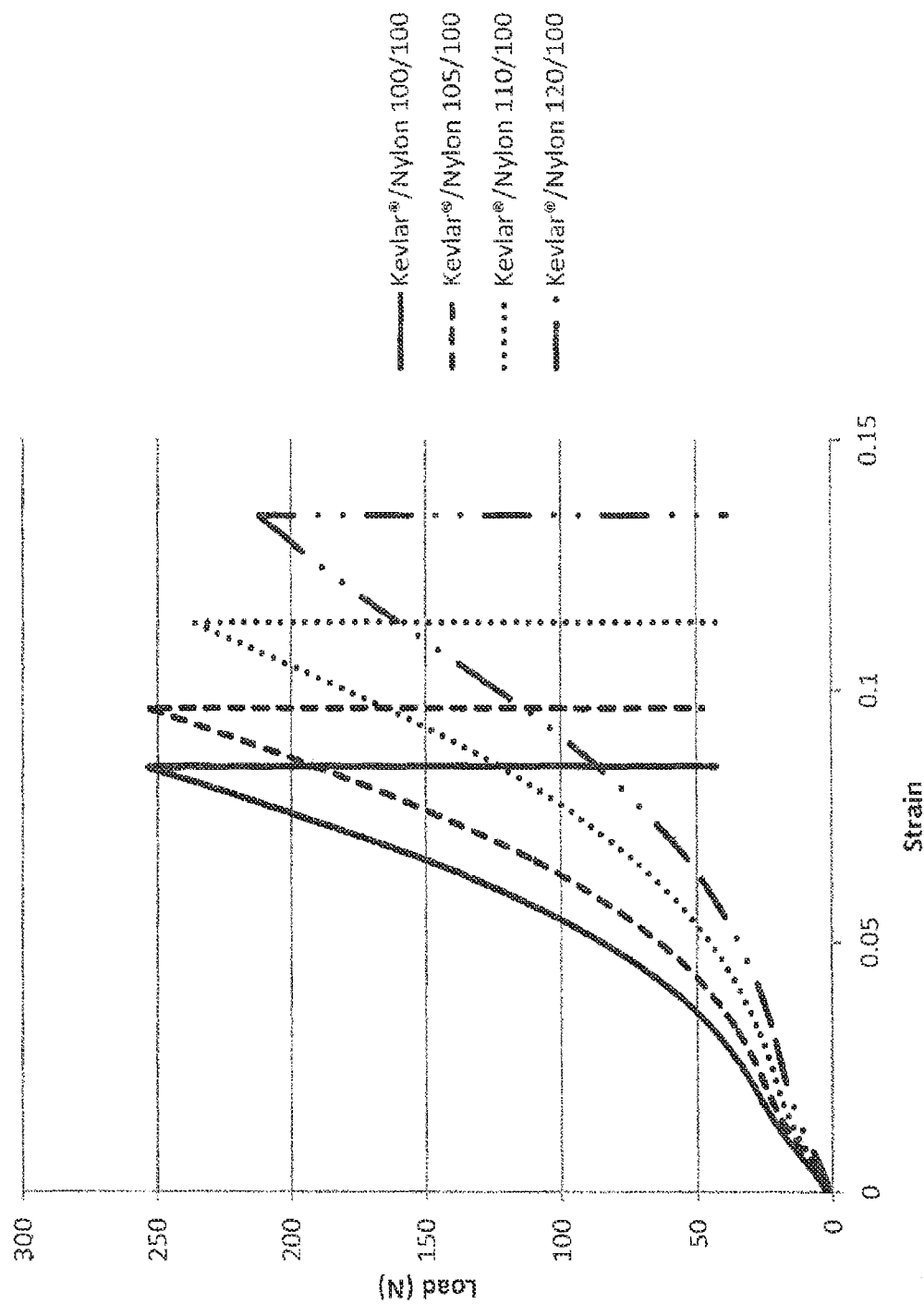
FIG. 4 is a graph showing load vs. elongation at break.

The curves in FIG. 4 demonstrate how the behavior of hybrid cords can be modified with different pulley ratios without changing the twist level of the cords. For the example of a Kevlar®/nylon hybrid, 100/100 denotes that the diameter of the pulley over which the Kevlar® yarn was the same as the diameter of the pulley over which the nylon yarn was fed. Kevlar®/nylon hybrid, 105/100 denotes that the diameter of the pulley over which the Kevlar® yarn was fed was 5% larger than the diameter of the pulley over which the nylon yarn was fed and similarly for the other curves in FIG. 4. In certain tire applications higher elongations and lower initial modulus are desired and can be achieved by using a larger pulley for the Kevlar® ply.

The invention claimed is:

1. A method of providing a hybrid cord with predetermined twist and component ply lengths comprising the steps of
(i) identifying the desired cord twist multiplier and component ply lengths,
(ii) identifying the number of component plies and the composition of each ply,
(iii) providing a cabling machine,
(iv) selecting appropriate size pulleys for the regulator of the cabling machine such that the pulleys on a first side are larger than the pulleys on a second side so as to provide the desired component ply length in the cord,
(v) setting the desired twist level for the hybrid cord into the cabling machine,
(vi) feeding the plies into the cabling machine, and
(vii) producing a cabled cord having the desired twist multiplier and component ply lengths.

2. The method of claim 1 wherein the component plies have zero twist.

3. The method of claim 1, wherein the component plies all have the same twist.

4. The method of claim 1, wherein at least two of the component plies have a different twist.

* * * * *